July 14, 1959  W. MASSIERER  2,894,758
SPECIAL PURPOSE CHUCK
Filed March 28, 1958

INVENTOR.
WALTER MASSIERER
BY

United States Patent Office 2,894,758
Patented July 14, 1959

2,894,758

SPECIAL PURPOSE CHUCK

Walter Massierer, Philadelphia, Pa.

Application March 28, 1958, Serial No. 724,779

3 Claims. (Cl. 279—56)

(Granted under Title 35, U.S. Code (1952), sec. 266)

The invention described herein may be manufactured and used by or for the Government for governmental purposes without the payment of any royalty thereon.

This invention relates to improvements on the special purpose chuck disclosed by United States Patent No. 2,428,375 granted October 7, 1947 to Walter Massierer.

The chuck disclosed by the aforesaid patent includes a plurality of work holding jaws which are coupled to an adapter by means of pins and are forced into engagement with the work by means of a collar threaded to one end of the adapter. The purpose of the present invention is to so modify this chuck that the jaws are more rigidly supported and more easily withdrawn from the work. A further purpose is the provision of means for the disposal of the particles produced by the grinding operation.

The invention will better be understood from the following description when considered in connection with the accompanying drawings and its scope is indicated by the appended claims.

Referring to the drawings.

Figure 1:
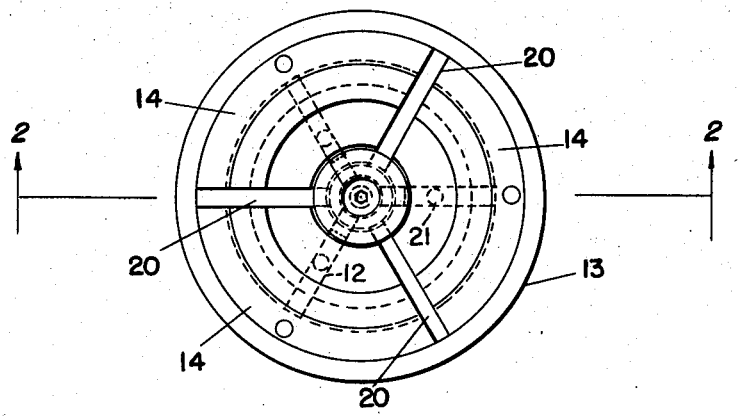
Fig. 1 is a top view of the improved chuck.
Figure 2:
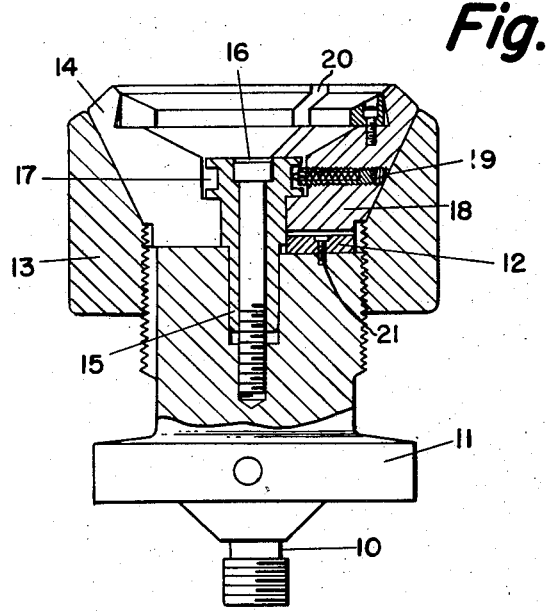
Fig. 2 is a section taken on the line 2—2 of Fig. 1.

The chuck of Figs. 1 and 2 includes a rotatable spindle 10 fixed to an adapter 11 which has three equally spaced keys 12 fixed to its upper surface by screws 21 and has an external thread arranged to cooperate with the internal thread of a collar 13. The collar 13 has an outwardly sloping surface which slidably engages the exterior surfaces of three equally spaced jaws 14.

Extending into the adapter 11 is a pin 15 which is held in place by a screw 16 and has a groove 17 around its head. It will be noted that each of the jaws 14 has an inward extension 18 which fits under the head of the pin 15 and a slot which slidably engages one of the keys 12. The function of the keys 12, like that of the pins disclosed in the aforesaid patent, is to transmit torque to the jaws 14. The keys 12, however, perform the additional function of preventing rocking of the jaws about the hub.

Each of the jaws 14 has threaded into it a thrust pin 19 which engages the circumferential groove 17 in the head of the pin 15 and is biased into contact therewith by a spring 21. The tension of each spring 21 is adjustable to equalize the tension on all the jaws. The function of the spring is to thrust the jaws 14 outwardly when the collar 13 is screwed down on the adapter 11 to release the jaws.

To dispose of the particles produced by the grinding operation to better advantage, slots 20 are made along the threaded cylindrical surface of the adapter. These slots extend parallel to the axis of the adapter and are aligned with the space between the adjacent jaws. They are effective to prevent clogging of the chuck elements.

I claim:

1. In an adjustable chuck for holding optical blanks, the combination of an adapter arranged at one of its ends for attachment to a spindle shaft and having an external thread near its other end, a plurality of jaws each slidably coupled to said adapter and each having an inwardly extending projection and an outwardly sloping exterior surface, a pin fixed to said adapter with its head engaging the projections of said jaws and having a circumferential groove in said head, a collar threaded to said adapter for slidable engagement with the exterior of said jaws, and a plurality of pins each mounted in a different one of said jaws and spring biased into engagement with said circumferential groove.

2. In an adjustable chuck for holding optical blanks, the combination of an adapter arranged at one of its ends for attachment to a spindle shaft and having an external thread near its other end, a plurality of jaws each slidably coupled to said adapter and each having an inwardly extending projection and an outwardly sloping exterior surface, a pin fixed to said adapter with its head engaging the projections of said jaws and having a circumferential groove in said head, a collar threaded to said adapter for slidable engagement with the exterior of said jaws, a plurality of pins each mounted in a different one of said jaws and spring biased into engagement with said circumferential groove, and means providing between said jaws a path for the removal of particles produced by the grinding of said blanks.

3. In an adjustable chuck for holding optical blanks, the combination of an adapter arranged at one end for attachment to a spindle shaft and having on its other end a plurality of keys, said adapter having an external thread, a plurality of jaws each grooved at its base slidably to receive a different one of said keys and each having an inwardly extending projection, the exterior of said jaws having an outward slope, a pin fixed to said adapter with its head engaging the projections of said jaws, said head having a circumferential slot, a collar threaded to said adapter for slidable engagement with the exterior of said jaws, and a plurality of pins each mounted in a different one of said jaws and spring biased into engagement wtih said circumferential groove.

References Cited in the file of this patent

UNITED STATES PATENTS 2,428,375    Massierer ---------------- Oct. 7, 1947